(12) United States Patent
Schnabel

(10) Patent No.: US 9,856,064 B2
(45) Date of Patent: Jan. 2, 2018

(54) PACKAGING CONTAINER FOR LIQUIDS WITH FRANGIBLE FLAP

(71) Applicant: Bemis Company, Inc., Neenah, WI (US)

(72) Inventor: Donald C. Schnabel, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 14/500,511

(22) Filed: Sep. 29, 2014

(65) Prior Publication Data

US 2016/0090225 A1    Mar. 31, 2016

(51) Int. Cl.
| | |
|---|---|
| *B65D 33/00* | (2006.01) |
| *B65D 65/26* | (2006.01) |
| *B65D 75/58* | (2006.01) |
| *B65D 65/14* | (2006.01) |
| *B65D 65/42* | (2006.01) |

(Continued)

(52) U.S. Cl.
CPC .......... *B65D 75/5855* (2013.01); *B32B 3/266* (2013.01); *B32B 5/142* (2013.01); *B32B 7/12* (2013.01); *B32B 7/14* (2013.01); *B32B 15/08* (2013.01); *B32B 15/20* (2013.01); *B32B 27/08* (2013.01); *B32B 27/302* (2013.01); *B32B 27/306* (2013.01); *B32B 27/32* (2013.01); *B32B 27/34* (2013.01); *B32B 27/36* (2013.01); *B65D 25/205* (2013.01); *B65D 65/14* (2013.01); *B65D 65/42* (2013.01); *B65D 85/72* (2013.01); *B32B 2255/10* (2013.01); *B32B 2270/00* (2013.01); *B32B 2307/514* (2013.01); *B32B 2307/58* (2013.01); *B32B 2307/7244* (2013.01); *B32B 2307/748* (2013.01); *B32B 2307/75* (2013.01); *B32B 2439/70* (2013.01); *B65D 2231/022* (2013.01); *B65D 2575/586* (2013.01)

(58) Field of Classification Search
CPC .... B65D 75/5855; B65D 65/14; B32B 3/266; B32B 7/12; B32B 7/14
See application file for complete search history.

(56) References Cited

U.S. PATENT DOCUMENTS

| | | | | | |
|---|---|---|---|---|---|
| 4,324,823 | A | * | 4/1982 | Ray, III | ................ G09F 3/0292 206/831 |
| 4,345,393 | A | * | 8/1982 | Price | .................... G09F 3/0289 206/831 |

(Continued)

FOREIGN PATENT DOCUMENTS

| | | |
|---|---|---|
| EP | 0942878 A1 | 9/1999 |
| EP | 0944537 A1 | 9/1999 |

(Continued)

*Primary Examiner* — Derek Battisti
(74) *Attorney, Agent, or Firm* — Amy L. De Coster

(57) ABSTRACT

Packaging containers for liquids, such as beverages, comprise at least one sidewall comprising an abuse layer comprising a frangible flap; a zoned release coating on an inner surface of the abuse layer over an area that includes the frangible flap; and an inner layer; wherein upon peeling the frangible flap, a portion of the inner layer is exposed intact. A sanitary surface is provided for receiving a straw. Because there is not a pre-formed opening for the straw, the receipt by the inner layer of a straw conforms exactly to the straw, which fits snugly with the container during use.

7 Claims, 3 Drawing Sheets

(51) Int. Cl.

| | | |
|---|---|---|
| B65D 85/72 | (2006.01) | |
| B65D 25/20 | (2006.01) | |
| B32B 5/14 | (2006.01) | |
| B32B 7/12 | (2006.01) | |
| B32B 7/14 | (2006.01) | |
| B32B 15/08 | (2006.01) | |
| B32B 15/20 | (2006.01) | |
| B32B 27/08 | (2006.01) | |
| B32B 27/30 | (2006.01) | |
| B32B 27/32 | (2006.01) | |
| B32B 27/34 | (2006.01) | |
| B32B 27/36 | (2006.01) | |
| B32B 3/26 | (2006.01) | |

(56) References Cited

U.S. PATENT DOCUMENTS

| | | | |
|---|---|---|---|
| 4,526,405 A * | 7/1985 | Hattemer | B31D 1/021 |
| | | | 283/81 |
| 4,858,766 A * | 8/1989 | Tsai | B65D 5/705 |
| | | | 220/255.1 |
| 5,423,583 A | 6/1995 | Crockom | |
| 5,551,781 A * | 9/1996 | Wilkes | A61B 19/026 |
| | | | 206/439 |
| 5,653,473 A * | 8/1997 | Laszutko | G09F 3/10 |
| | | | 283/101 |
| 5,833,368 A | 11/1998 | Kaufman | |
| 5,868,658 A | 2/1999 | Wild | |
| 5,997,177 A * | 12/1999 | Kaufman | B65D 75/5827 |
| | | | 383/202 |
| 6,234,310 B1 * | 5/2001 | Goldhaber | A61B 19/026 |
| | | | 141/314 |
| 6,334,711 B1 | 1/2002 | Risgalla et al. | |
| 6,383,592 B1 * | 5/2002 | Lowry | B65D 31/02 |
| | | | 206/459.5 |
| 7,175,581 B2 | 2/2007 | Murray | |
| 7,608,317 B2 * | 10/2009 | Keckeisen | B32B 27/08 |
| | | | 156/250 |
| 2002/0114543 A1 | 8/2002 | Murray | |
| 2003/0128899 A1 | 7/2003 | Dennis | |
| 2006/0133701 A1 * | 6/2006 | Daniels | B31B 19/90 |
| | | | 383/127 |
| 2006/0285780 A1 * | 12/2006 | Knoerzer | B65D 31/02 |
| | | | 383/111 |
| 2009/0180718 A1 | 7/2009 | Walker et al. | |
| 2012/0048857 A1 * | 3/2012 | Bando | B32B 1/02 |
| | | | 220/260 |
| 2013/0101239 A1 | 4/2013 | Kropf et al. | |

FOREIGN PATENT DOCUMENTS

| | | |
|---|---|---|
| WO | 9746459 A1 | 12/1997 |
| WO | 2005034835 A2 | 4/2005 |

* cited by examiner

PACKAGING CONTAINER FOR LIQUIDS WITH FRANGIBLE FLAP

TECHNICAL FIELD

The present disclosure relates to packaging containers for liquids such as pouches and boxes that provide sanitary surfaces for receiving straws. The containers comprise a frangible flap in an outer abuse layer that when peeled away exposes a portion of an inner layer intact for receiving the straw. The portion of the inner layer that is intact may further have a pressure sensitive adhesive for resealing of the frangible flap. A tab may extend from the flap for ease of handling.

BACKGROUND

Stand-up bags and pouches that use a straw are in the art of beverage containers. In CA1116130, a multilayered beverage container is constructed with an insertion opening through outside layers up to an inner layer and a tear-off closure strip covering the insertion opening, where in use, the strip tears the inner layer to expose the insertion opening in its entirety. U.S. Pat. No. 5,425,583, which is directed to a stand-up bag, sought to eliminate the tear-off strip of CA1116130 by providing a piercing opening for the straw that is through all layers of the bag material and a sealing foil or strip that is affixed to an inner side of the material around the piercing opening. Thus, the sealing foil or film is outwardly exposed but there is not a tear-off tab that needs disposing. The sealing film, however has the potential to be exposed to unsanitary conditions prior to being punctured by the straw.

In U.S. Patent Appln. Pub. No. 2013/0101239, a packing container with a pull tab built into the packing material is disclosed, where a closure film is provided in the area of the pull tab, and only a connection area of the pull tab that is connected to the closure film makes an opening in the closure film for the straw There is an on-going need to provide liquid packaging containers such as pouches or boxes that provide excellent protection to and sanitary conditions for beverages such as juice, while at the same time are economical and customizable to consumer's needs.

SUMMARY

In order to provide sanitary conditions for receiving a straw and for providing a resealable container—a pouch or box, for example, having at least one sidewall—provided are frangible flaps formed in an exterior or abuse layer of the container that may be resealed as needed. A tab that is also frangible may extend from the flap for ease of handling. Upon peeling of the frangible flap and optional tab, a portion of an inner layer of the sidewall is exposed intact. That is, no ripping of the inner layer occurs. By exposing the inner layer of the sidewall and not an additional secondary film, there are no extra material handling or manufacturing steps. Also, a sanitary surface—one that has not been exposed to the environment during handling—is provided for receiving a straw. Because there is not a pre-formed opening for the straw, the receipt by the inner layer of a straw conforms exactly to the straw being used and the straw fits snugly with the container during use. When a pressure sensitive adhesive is provided on the portion of the inner layer that is intact, the flap may be resealed.

In an aspect, therefore, provided are packaging containers for liquids, such as beverages, the containers comprising: at least one sidewall comprising an abuse layer comprising a frangible flap; a zoned release coating on an inner surface of the abuse layer over an area that includes the frangible flap; and an inner layer; wherein upon peeling the frangible flap, a portion of the inner layer is exposed intact.

Other features that may be used individually or in combination with respect to any aspect of the invention are as follows.

The packaging containers may further comprise: a first adhesive coating on the inner surface of the abuse layer excluding the zoned release coating and contacting a first surface of the inner layer; a second adhesive coating on a second surface of the inner layer; and a sealant layer affixed to the inner layer by the second adhesive coating.

The packaging containers may further comprise: a pressure sensitive adhesive on at least a part of the portion of the inner layer that is exposed intact. In this way, the frangible flap may be resealed to the inner layer.

The abuse layer may comprise a polyester, for example an oriented polyethylene terephthalate (OPET). The abuse layer may be reverse-printed with indicia. Specifically, the frangible flap may comprise indicia, which could provide, for example, a coupon or a game for consumer use.

The inner layer may comprise a barrier layer, which may be an ethylene-vinyl alcohol ("EVOH") copolymer film or a foil film.

The sealant layer may comprise a polyolefin, a polyester, a polyamide, a polystyrene, and blends thereof.

One specific combination is: the abuse layer comprises an oriented polyethylene terephthalate (OPET), the inner layer comprises a foil film, and the sealant layer comprises a polyethylene.

The packing containers may comprising two or more sidewalls formed into a pouch. The portion of the inner layer that is exposed intact may be effective to retain a straw upon puncturing of the inner layer by the straw. The flap may further comprise a tab.

In another aspect, provided is a method of making a packaging container for a liquid, the method comprising forming at least one sidewall by: extruding a first polymer resin through a die thereby forming an abuse layer; applying a laser to the abuse layer to form a frangible flap; applying a zoned release coating on an inner surface of the abuse layer over an area that includes the frangible flap; extruding a second polymer resin through a die or obtaining a foil film thereby forming an inner layer; extruding a third polymer resin through a die or obtaining a polymeric film thereby forming a sealant layer; applying a first adhesive coating on the inner surface of the abuse layer excluding the zoned release coating and affixing a first surface of the inner layer thereto; applying a second adhesive coating on a second surface of the inner layer and affixing the sealant layer thereto; and adhering the at least one sidewall to itself or a plurality of sidewalls to each other to create a seam thereby forming a liquid container.

An additional aspect is a method of delivering a liquid product in a packaging container, the method comprising: obtaining any packing container disclosed herein packaging the liquid product in the packaging container; peeling the frangible flap; and inserting a straw into the portion of the inner layer that is exposed intact. The method may further comprise resealing the frangible flap to the inner layer.

These and other aspects of the invention are described in the detailed description below. In no event should the above summary be construed as a limitation on the claimed subject matter.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Figure 1A:
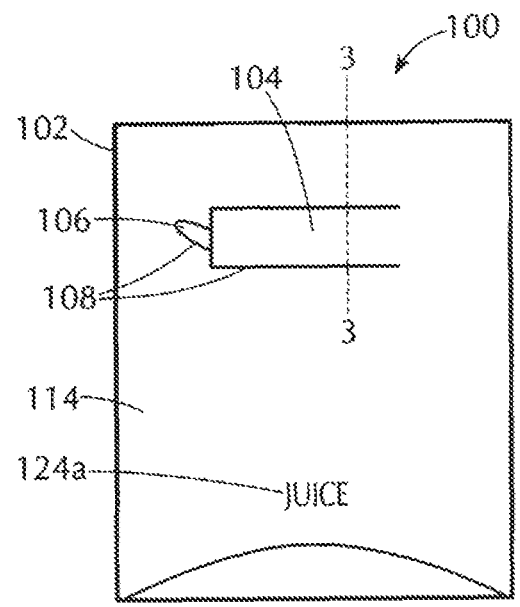
FIGS. 1A and 1B show a schematic view of an exemplary liquid packaging container in the shape of a pouch.

Provided are packaging containers for liquids formed from at least one sidewall, the sidewall has at least an abuse layer and an inner layer. There is a frangible flap in the abuse layer and a zoned release coating on an inner surface of the abuse layer over an area that includes the frangible flap. Upon peeling of the frangible flap, a portion of the inner layer is exposed intact.

Reference to "exposed intact" means that no ripping by a layer being removed occurs to the layer that is so exposed. The layer being removed is therefore not adhered or is only weakly adhered to the layer being exposed.

Reference to "frangible" means easily broken.

A "layer" as used herein refers to a building block of sidewalls that is a structure of a single polymer-type or a blend of polymers or that may be an additive.

Reference to "abuse layer" or "outer layer" as used herein refers to the portion of the container that located outermost of all the layers and is subject to handling and the environment. The abuse layer is exposed to varying conditions at any given time, some of which may be unsanitary.

Reference to an "inner surface" means the surface of a layer away from the outer layer and towards the interior where the liquid is packaged.

An "inner layer" as used herein refers to a layer is that is not exposed the environment. An exemplary inner layer is a barrier layer, which provides protection to the packaged liquid for freshness and/or a barrier to oxygen. The sealant layer is also an inner layer. An inner layer may be continuous throughout an overall sidewall structure, or it may be discontinuous—located only in the area of the frangible flap.

A "sealant layer" is one that seals to itself to form a liquid-tight seal. That is, the sealant layer comprises a thermoplastic polymer or polymer mixture that softens when exposed to heat and returns to its original condition when cooled to room temperature.

A "sidewall" is a discrete piece of polymer film or multi-layer laminate that is sealed to itself or another sidewall by, for example, welding or an adhesive, to form a pouch or a bag.

Materials

The abuse layer may comprise any suitable polyester. An exemplary polyester is an oriented polyethylene terephthalate (OPET).

In general, the sealant layer may comprise any suitable thermoplastic material including, but not limited too, synthetic polymers such as polyesters, polyamides, polyolefins, polystyrenes, and the like. Thermoplastic materials may also include any synthetic polymer that are cross-linked by either radiation or chemical reaction during a manufacturing or post-manufacturing process operation. Exemplary polyolefins include polyethylene (PE) and polypropylene (PP).

A layer having an ethylene/vinyl alcohol "EVOH") copolymer film provides oxygen barrier protection and may be suitable in an inner layer such as a barrier layer. A foil film, such as aluminum foil, also provides oxygen barrier protection and may be suitable alone or in combination with other films in an inner layer such as a barrier layer.

Between any of the layers, an adhesive coating or layer may be provided to provide adhesion and continuity between the layers. Adhesive compositions invention may include, but are not limited to: modified and unmodified polyolefins, preferably polyethylene, most preferably, ethylene/α-olefin copolymer, modified and unmodified acrylate resin, preferably selected from the group consisting of ethylene/vinyl acrylate copolymer, ethylene/ethyl acrylate copolymer, ethylene/butyl acrylate copolymer, or blends thereof. EVA is an ethylene/vinyl acetate co-polymer, which may be used in particular to form a layer to facilitate bonding of polymerically dissimilar layers.

Features

The packaging containers such as pouches or boxes may be configured as needed to fit the needs of the juice-producer and/or consumer. Also, indicia of the container is tailored to convey information as desired by the juice-producer and/or consumer. The flap itself may provide product coupons or games for the consumer.

The frangible flap and optional tab may be a die cut or laser cut region in the abuse or outer layer. When a release coating is used on an area on an inner surface of the abuse layer that is slightly larger than the frangible flap and optional tab, a portion of the inner layer remains intact when the frangible flap and optional tab is peeled.

A straw is typically provided with these pouches and boxes. In use, the frangible flap and optional tab are peeled away to expose a portion of the inner layer intact, leaving a surface to receive the straw. The frangible flap may be resealable onto the inner layer by a pressure sensitive adhesive. Also, the frangible flap and optional tab may be formed into a loop that can help secure the straw to the pressure sensitive adhesive after a partial drinking of the beverage.

Fabrication

In general terms, to form the containers disclosed herein, the following steps are used. A desired sidewall is formed by making a multi-layered laminate that includes a frangible tab. To form the multi-layered laminate, techniques known in the art may be used in conjunction with design of a release coating in a desired area to account for the frangible flap and with a laser to form the frangible flap. In general terms, there is at least an abuse layer and an inner layer. In specific terms, there may be an abuse layer, an inner or barrier layer, and a sealant layer.

An exemplary multi-layered laminate may be formed by extruding a first polymer resin through a die thereby forming an abuse layer; applying a release coating on an inner surface of the abuse layer that is zoned over an area that will include a frangible flap; extruding a second polymer resin through a die or obtaining a foil film thereby forming an inner layer; extruding a third polymer resin through a die or obtaining a polymeric film thereby forming a sealant layer; applying a first adhesive coating on the inner surface of the abuse layer excluding the release coating and affixing a first surface of the inner layer thereto; applying a second adhesive coating on a second surface of the inner layer and affixing the sealant layer thereto; and adhering the at least one sidewall to itself or a plurality of sidewalls to each other to create a seam thereby forming a liquid container.

The frangible flap is formed by applying a laser to the abuse layer to form a laser cut. Application of the laser results in vaporization or delamination of a portion of abuse layer and optionally any adjacent adhesive layer and/or indicia ink while leaving the inner layer undamaged. An exemplary laser is a single beam refracted laser. A laser control system assists in controlling the shape of the flap and optional tab along with the depth of the cut.

Before describing several exemplary embodiments of the invention, it is to be understood that the invention is not limited to the details of construction or process steps set forth in the following description. The invention is capable of other embodiments and of being practiced or being carded out in various ways.

Figure 1B:
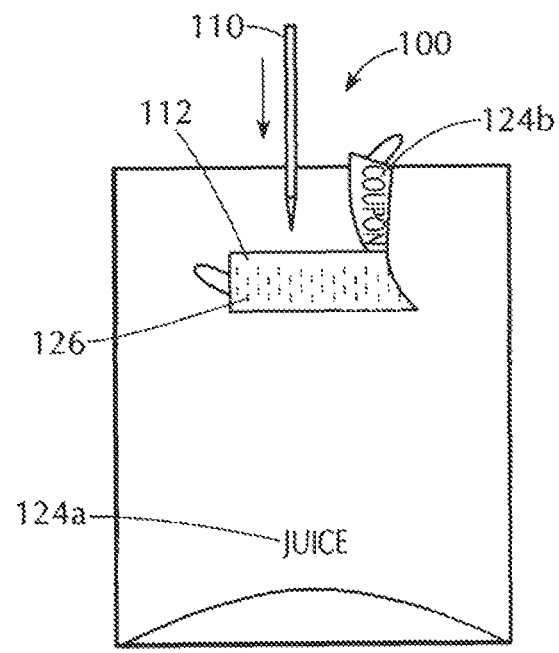

Turning to the figures, FIGS. 1A and 1B show a schematic view of an exemplary liquid packaging container 100 in the shape of a pouch. The liquid packaging container 100 comprises a sidewall 102 having a frangible flap 104 with an optional tab 106 both defined by a laser die cut 108. In FIG. 1A, the frangible flap 104 which is shown in the abuse layer 114 is unopened. Indicia 124a conveys the contents of the container as being "Juice" In FIG. 1B, the frangible flap is in an open position showing the portion of the outer surface of the inner layer 112 that is intact and optional pressure sensitive adhesive 126. There is no preformed hole in the inner layer. A "coupon" is indicia 124b on an inside surface of the flap. In use, straw 110 is inserted into the outer surface of the inner layer 112 that is intact and the straw is held in place without being loose. The frangible flap 104 may be resealable onto the inner layer by the pressure sensitive adhesive 126. Also, the frangible flap 104 and optional tab 106 may be formed into a loop that can secure the straw 110 after puncture and a partial drinking of the as juice.

Figure 2:
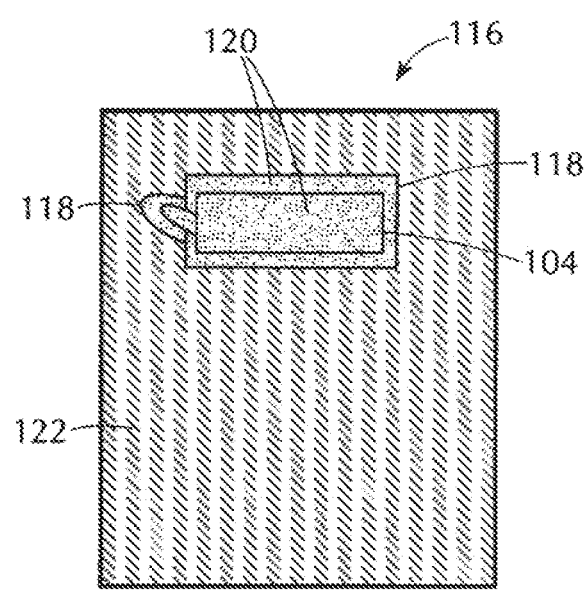
FIG. 2 is a schematic view of the inner surface of an abuse layer.

FIG. 2 is a schematic view of the inner surface 116 of the abuse layer 114. The underside of the frangible flap 104 is shown where there is an optional border 118 around the frangible flap 104. There is a zoned release coating 120 on the underside of the frangible flap 104 and its optional border 118. A first adhesive coating 122 is also on the inner surface 116 of the abuse layer 114 in this embodiment.

Figure 3:
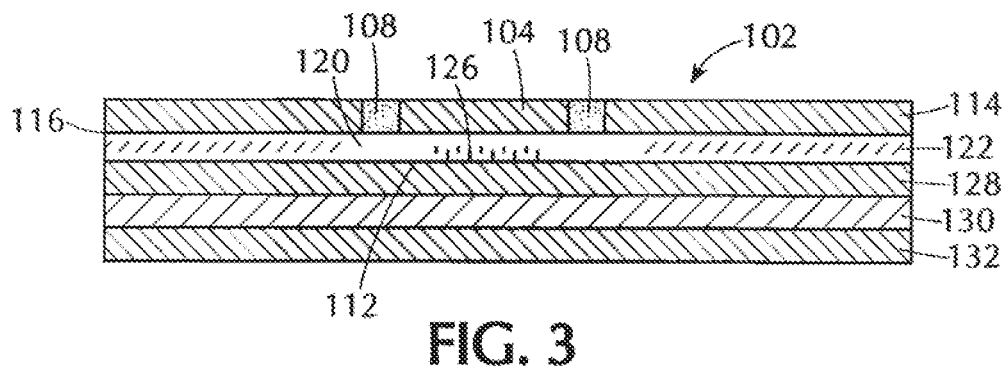
FIG. 3 is a cross-section view of the sidewall of FIG. 1A taken along line 3-3.

FIG. 3 is a cross-section view of the sidewall of FIG. 1A taken along line 3-3. In this embodiment, sidewall 102 has a frangible flap 104 defined by the laser die cut 108 in the abuse layer 114. On the inner surface of the abuse layer 114 is a first adhesive coating 122 that attaches the abuse layer 114 to the inner layer 128. Below the frangible flap 104 is a zoned release coating 120 that prevents the frangible flap 104 from sticking or adhering to the inner layer 128. Thus, upon opening of the frangible flap 104, the inner layer 128 is not ripped. An optional pressure sensitive adhesive 126 may be located below the frangible flap 104 as well. The inner layer 128 has a second adhesive coating 130 on the surface opposite where the first adhesive coating 122 is located. The second adhesive coating 130 attaches a sealant layer 132 to the inner layer 128.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A container for liquid, comprising at least one sidewall comprising: an abuse layer comprising a frangible flap defined by a cut of open geometry in the abuse layer such that the frangible flap remains hingedly and integrally attached to a remainder of the abuse layer, the frangible flap initially being disposed in a common plane with the remainder of the abuse layer; a release coating on an inner surface of the abuse layer over an area that includes the frangible flap; an imperforate inner layer comprising a pressure sensitive adhesive disposed on the imperforate inner layer facing the inner surface of the abuse layer; a first adhesive coating on the inner surface of the abuse layer excluding the release coating and contacting a first surface of the imperforate inner layer; a second adhesive coating on a second surface of the imperforate inner layer; and a sealant layer affixed to the imperforate inner layer by the second adhesive coating; wherein the abuse layer, the release coating, the frangible flap and the imperforate inner layer are integrally with the at least one sidewall of the container; wherein upon peeling the frangible flap away from the common plane, a portion of the imperforate inner layer including the pressure sensitive adhesive is exposed; the portion of the imperforate inner layer that is exposed is effective to retain a straw upon puncturing of the inner layer by the straw.

2. The packaging container of claim 1, wherein the abuse layer comprises a polyester.

3. The packaging container of claim 2, wherein the abuse layer is reverse-printed with indicia.

4. The packaging container of claim 1, wherein the imperforate inner layer comprises an ethylene-vinyl alcohol ("EVOH") copolymer film or a foil film.

5. The packaging container of claim 1, wherein the sealant layer comprises a polyolefin, a polyester, a polyamide, a polystyrene, and blends thereof.

6. The packaging container of claim 1 wherein the abuse layer comprises an oriented polyethylene terephthalate (OPET), the imperforate inner layer comprises a foil film, and the sealant layer comprises a polyethylene.

7. The packaging container of claim 3, wherein the frangible flap comprises indicia.

\* \* \* \* \*

UNITED STATES PATENT AND TRADEMARK OFFICE
CERTIFICATE OF CORRECTION

PATENT NO. : 9,856,064 B2  
APPLICATION NO. : 14/500511  
DATED : January 2, 2018  
INVENTOR(S) : Donald C. Schnabel It is certified that error appears in the above-identified patent and that said Letters Patent is hereby corrected as shown below:

In the Specification

In Column 4, Line 6, delete "limited too," and insert -- limited to, --, therefor.

In Column 4, Line 13, delete ""EVOH")" and insert -- ("EVOH") --, therefor.

In Column 5, Line 34, after ""Juice"" insert -- . --.

In the Claims

In Column 7, Claim 6, Line 7, after "claim 1" insert -- , --.

Signed and Sealed this
Twenty-ninth Day of October, 2019

Andrei Iancu
*Director of the United States Patent and Trademark Office*